Oct. 7, 1958 — S. R. CROCKETT — 2,854,744
METHOD OF LOCKING AND SEALING TUBULAR STRUCTURES
Filed Feb. 17, 1956 — 3 Sheets-Sheet 1

INVENTOR.
SYDNEY R. CROCKETT
ATTORNEYS

Oct. 7, 1958 S. R. CROCKETT 2,854,744
METHOD OF LOCKING AND SEALING TUBULAR STRUCTURES
Filed Feb. 17, 1956 3 Sheets-Sheet 2

INVENTOR.
SYDNEY R. CROCKETT
BY
ATTORNEYS

Oct. 7, 1958     S. R. CROCKETT     2,854,744
METHOD OF LOCKING AND SEALING TUBULAR STRUCTURES
Filed Feb. 17, 1956     3 Sheets-Sheet 3

INVENTOR.
SYDNEY R. CROCKETT
ATTORNEYS

United States Patent Office 2,854,744
Patented Oct. 7, 1958

2,854,744

METHOD OF LOCKING AND SEALING TUBULAR STRUCTURES

Sydney R. Crockett, China Lake, Calif., assignor to the United States of America as represented by the Secretary of the Navy Application February 17, 1956, Serial No. 566,319

3 Claims. (Cl. 29—516)

(Granted under Title 35, U. S. Code (1952), sec. 266)

The invention described herein may be manufactured and used by or for the Government of the United States of America for governmental purposes without the payment of any royalties thereon or therefor.

This invention relates to methods for locking and sealing tubular parts together, and more specifically to methods for locking and sealing a solid or tubular cylindrical member of given outside diameter to a second relatively thin-walled tubular member of equivalent inside diameter, and to the resulting joint structures.

Still more specifically, this invention relates to such methods and joints as applied to thin-walled aluminum alloy tubing as used, for example, as rocket motor tubing.

This invention is an improvement over the invention disclosed in my prior patent application, Serial Number 518,422, filed in the United States Patent Office on June 27, 1955, entitled, "Method of Locking and Sealing Tubular Structures." The invention disclosed in the said prior application has, for an object, the provision of methods utilizing "cold-flow" of metal to cause the pieces to form locked and sealed joints while obviating the costly close machining tolerances which were characteristic of the then known prior art methods for forming such joints. The introductory remarks in the specification of said application describe the prior art and its disadvantages, as well as the general advance effected therein. In general terms, the method of said prior application involves forming a circumferential groove in the surface of the wall of a first tubular member which is remote from the surface thereof to be engaged by a second member, as by cutting material from said surface, forming an annular channel in the wall of said second member in the surface thereof to be engaged by the first member, positioning said pieces with the groove and channel transversely aligned, and compressing said first member axially to cause the reduced tubular wall portion opposite said groove to flow into said channel to form the joint. This method represented a substantial advance in the known prior art and provided an economical and efficient method for joining elements of a thickness, strength and ductility suited to such methods and was especially well adapted for use with steel tubing, with which strong sealed joints could be made.

The method of my above mentioned prior invention did not lend itself to use with thin tubing of weak or brittle materials since the final joint was weakened too greatly by the removal of a portion of the material of the tubular member in the vicinity of the joint in the formation of the groove means therein. Moreover, it was discovered that thin and/or brittle materials were subject to breakage when compressed axially in an attempt to cause the "cold-flow" required to form a joint according to said prior invention. The present invention relates to novel modification of the prior method to permit the formation of locked and sealed joints with thin-walled tubing of relatively weak material, as aluminum alloy, and is predicated upon two interrelated discoveries, namely that "cold-flow" could be induced in a predetermined area by impressing an indentation in the wall of the tubing without removing any material therefrom, and that thin tubing of relatively weak material could be compressed axially with sufficient force to cause cold flow, without rupturing, if it were subject to radial compressive forces at the same time. Joints made according to this last mentioned novel method consistently prove to exceed the strength of the tubing when subjected to hoop stresses and to compressive stresses and to be of adequate sealed tightness to retain even the hot, high pressure gases incident to rocket motor operation. This is highly important in the field of rocketry since it makes possible the use of lighter alloys of minimum thickness as the tubing for rocket motors with attendant reduction in weight and improved efficiency in rocket performance.

It is, therefore, an object of this invention to provide new and improved methods for forming locked and sealed joints between tubular outer members of given inside dimensions and inner members of equivalent but slightly smaller outside dimensions, said method being capable of application to comparatively thin-walled tubing of relatively weak materials.

It is a further object of this invention to provide a method wherein a tubular joint may be effected by the cold-flow of material from one of the elements into a groove in the other, in which the area in which the cold-flow of material occurs may be controlled, and in which the tubular element subject to stress to cause such cold-flow is protected against bursting or cracking while so stressed, whereby relatively thin-walled and weak tubular elements may be utilized.

Another object of this invention is to provide new and improved rocket structures wherein thin-walled tubing of relatively weak material, such as aluminum alloy, may be joined to rocket nozzle-plate and head closure members in a manner to preclude the escape of propulsive gases therethroguh.

Still another object of this invention is to provide methods for joining thin-walled tubular elements, said methods being capable of forming effective, tightly sealed and locked joints without the necessity of close tolerances in machining and in configuration and being capable of use with tubular elements made of relatively weak or brittle materials.

It is a still further object of this invention to provide improved locked and sealed joints for tubular elements of relatively thin-walled and/or weak or brittle construction, which are more easily and cheaply constructed than prior art joints as utilized on similar materials.

Other objects and many of the attendant advantages of this invention will be readily appreciated as the same becomes better understood by reference to the following detailed description when considered in connection with the accompanying drawings wherein.

Figure 1:
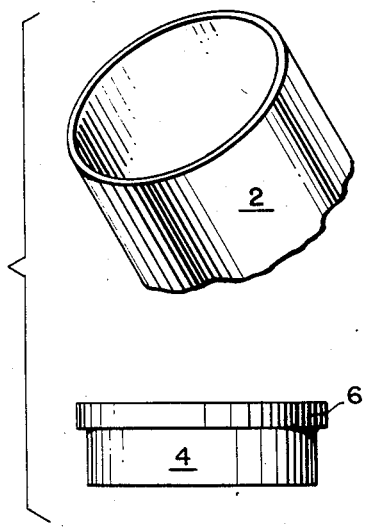
Fig. 1 is a view showing the component parts of a joint made according to this invention, illustrating, by way of example, an open ended tubular body (shown in perspective) and a flanged cap element (shown in elevation) prior to their preparation for joining.
Figure 2:
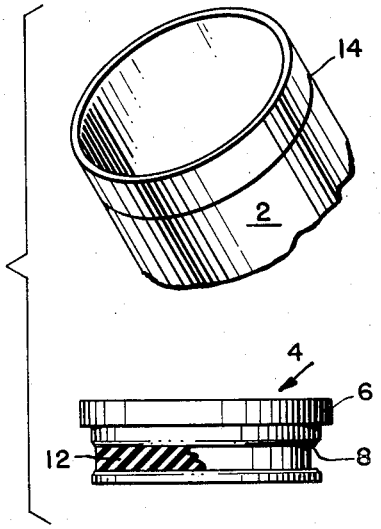
Fig. 2 is a view similar to Fig. 1, showing the members to be joined after they have been prepared for joining according to this invention.
Figure 3:
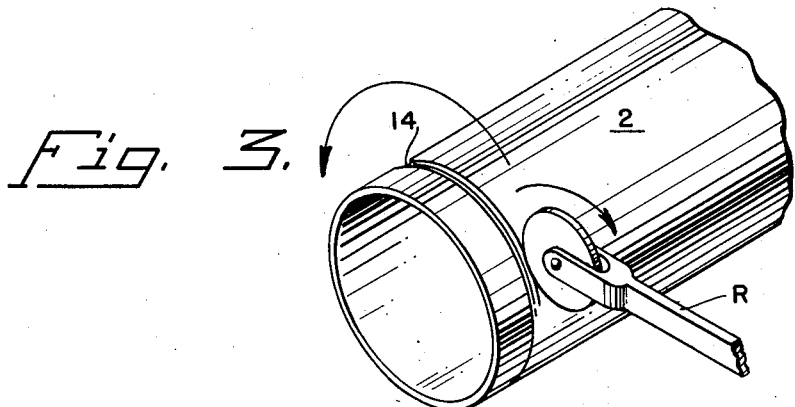
Fig. 3 is a perspective view showing the manner of rolling an indentation in the outer wall of a tubular member, according to this invention, whereby to control the area of deformation when axial pressure is applied to the body.

The methods of this invention are shown in the drawings, in Figs. 1 to 8, in connection with one particular application thereof, namely in the connection of an end cap member to a tubular member. This example has been chosen for ease of illustration, it being obvious that members other than cap type members could be similarly joined, it being required only that the member fitting inside the larger member have a flange or shoulder to bear upon the end of the tubular member and this is illustrated by the joint between the nozzle plate and tube member shown in Fig. 9.

Referring now to the drawings, one example of elements which can be joined by the novel method of this invention has been chosen for purposes of illustration and is depicted in Figs. 1 to 8, in which like numerals refer to like parts throughout. Two pieces to be joined are shown in Fig. 1, namely a tubular member 2 and a cap element 4, of an outer diameter to fit loosely within the tubular member 2, and having a radially outwardly extending flange 6.

A method of forming a joint between two such members according to this invention may be broadly described as including five major operations, as follows: (1) preparing the closure cap; (2) preparing the tubular member; (3) assembling the prepared cap and tubular member; (4) laterally compressing the assembly in a die; and (5) applying longitudinal pressure to complete the joint.

Figure 4:
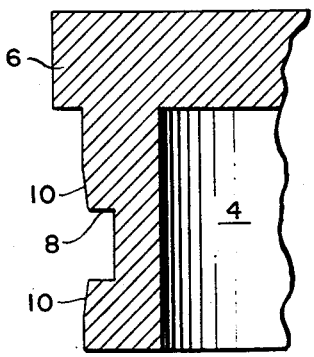
Fig. 4 is an enlarged fragmentary vertical section through a cap member such as shown in Fig. 1 showing its configuration in detail, after it has been prepared for joining, according to this invention.
Figure 5:
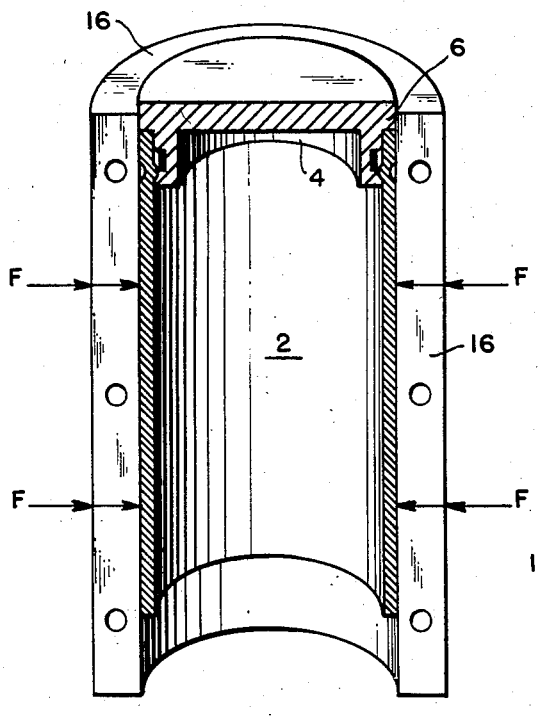
Fig. 5 is a perspective sectional view of the prepared members, as shown in Fig. 2, in position in a mold (half of which has been removed) prior to the application of longitudinal force thereto.
Figure 5A:
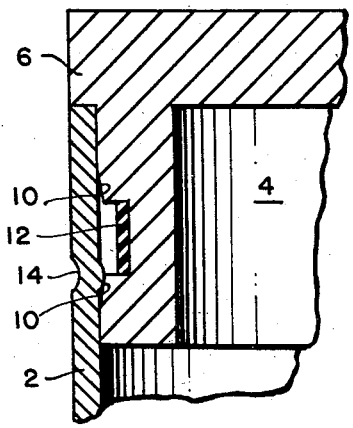
Fig. 5A is an enlarged fragmentary vertical section through the pieces to be joined, in the area of the proposed joint, showing the disposition of the pieces, as assembled, prior to the application of pressure to form the joint.

The closure cap is prepared by taking the flanged blank cap as shown in Fig. 1 and by forming an external circumferential groove 8 therein, in a plane normal to the longitudinal axis of the cap, as shown in enlarged detail in Fig. 4. Groove 8 is spaced from flange 6 a desired distance and made of a width and depth sufficient to accommodate a rubber sealing insert, to be later described, and a bead of metal to be flowed into the groove from the tubular member by means also to be later described. The external walls of the cap 4 are then cut to provide slightly beveled surfaces 10, as best seen in Figs. 4 and 5A to provide "approaches" to the groove to facilitate the flow of the metal of the tubular member 2 into the groove 8 when the joint is formed (compare Figs. 5A and 6A), inclines in the order of 6 degrees being suitable for this purpose. The outer diameter of the flange 6 is turned to a size slightly less than that desired for the outer diameter of the finished tubing so that it can move into the die 16 (to be later described). The preparation of the cap member may then be completed by the installation of a rubber or the like sealing ring 12 in the groove. Such a ring may be of any cross-sectional configuration but is preferably of the rectangular cross-section shown in the drawings since such a configuration provides a symmetrical space to receive the inflowing metal and permits an even extrusion of rubber into the area of contact between the exterior of the closure cap and the interior wall of the tubular member. Obviously, if a fluid-tight sealed joint is not required the sealing member 12 may be omitted.

The tubular member 2 is of a material which is relatively softer than that of the cap member 4. Preparation of such a tubular member for formation of a joint consists in rolling a light circumferential indentation 14 into its exterior surface, the purpose of which is to establish the exact place where deformation caused by the cold flow of the metal will take place when axial pressure is applied to the tubular member. It should be noted that no metal is removed and that a mere indentation as described is sufficient to control and guide the metal, and this is one of the cardinal and critical features of the instant invention since the discovery that a mere indentation (rather than the removal of material) could be used to control the nature and degree of metal flow led to resulting joints in which the material of the tubular member was thickened and strengthened at the joint. In the development of this method, experimentation revealed that the indentation should have a depth just enough to enable one to barely feel a ridge (or see it) on the interior surface of the tube. It has been found that an appreciably deeper indentation (for thin tubing) may result in cracking and that a still shallower one may cause unsymmetrical metal flow. An indentation depth of about 0.015 inch has been found ideal for thin-walled tubing and is formed by a roller R (Fig. 3) having rounded shoulders and bottom to produce a rounded contour in the indentation to better facilitate a smooth even flow of metal.

Figure 6:
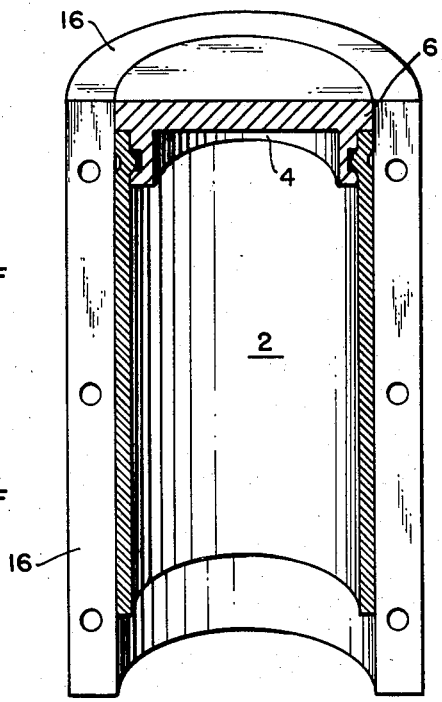
Fig. 6 is a view similar to Fig. 5 showing the finished joint in position in the mold member.
Figure 6A:
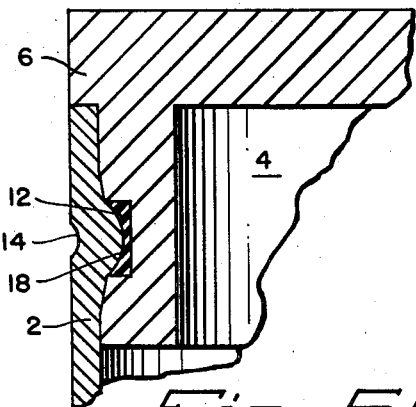
Fig. 6A is a view similar to Fig. 5A showing the details of the construction of the finished joint.

The indentation 14 formed in the tubular member is rolled at a distance from the end of the tube which is greater than the distance of the center of the groove 8 from the lower shoulder of the flange 6 on the cap (as shown in Fig. 5A), the difference in these distances representing the apparent relative motion between the indentation and the edge of the tube when the metal is flowed into the rectangular groove in the cap member (compare Figs. 5A and 6A). For thin-walled tubing this greater spacing is in the order of 0.075 inch but variation is obviously possible depending upon the specific nature of materials, the width and depth of the groove in the cap member, and the nature and cross-sectional area of the sealing ring in the groove.

With the tubular member 2 and the cap member 4 prepared as described above, the said parts are then brought into an assembled relation by inserting the cap member within the tubular member so that the lower surface of the flange 6 rests upon the edge of the tubular member 2, as shown in Fig. 5A. In this connection it should be pointed out that the outer diameter of the inserted portion of cap 4 is machined to a size to allow a loose fit for easy insertion of the cap member within the tubular member and to permit the lower portion of the cap to be more easily forced past the radially inwardly directed protuberance formed by the rolling of the indentation 14 in the outer surface of the tubular member (see Fig. 5A).

The assembled cap and tubular member are then assembled in a two-section die 16, the die being formed of such dimensions relative to that of the tubular member, that when its two sections are firmly locked down upon the assembly, it diminishes the diameter of the tubular member by about 0.010 inch. The cap and tube assembly is placed in the loosely joined die sections so that a small portion of the flange 6 protrudes above the die as clearly shown in Fig. 5. The die sections are then firmly locked down to apply compressive force F circumferentially on the tubular member as shown in Fig. 5. Such circumferential compression serves several purposes, it holds the tubular member in round, and so insures its axial alignment with the closure cap and it keeps the tube from slipping longitudinally (even without bottom support) when axial pressure is applied, which is very important since the end of the tube opposite the closure cap would be deformed if it had to be used as a support or force applying surface.

The assembly in the die is then placed vertically in a hydraulic press with the free end section (flange 6) of the cap member uppermost, and axial pressure slowly applied while the circumferential pressure is continued. This causes the free end section to move down from the position shown in Fig. 5 to that shown in Fig. 6, the tubular body itself being held against axial movement by the circumferential compressive forces applied by the die 16. This results in the change in the relative arrangement brought out particularly by comparison of Figs. 5A and 6A. The wall of tubular member 2 cannot expand or crack externally because of the restraint of the die 16 and the continuation of compressive axial forces causes cold flow of the material to take place at the preselected area defined by the indentation 14. As this flow proceeds, the cap member 4 rides down farther into the tubular member, the beveled portions 10 assisting the inner protuberance of indentation 14 to enter the groove 8 and the compressive force is continued until the top of the cap is level with the top of the die, the relative sizes and disposition of the parts being so chosen that at this point the flowed material forms an enlarged plug 18 extending into groove 8 and compressing the sealing member 12 to form a locked and sealed joint as best seen in Figs. 6 and 6A.

Joints made by the above described method have proven by test to be stronger than the tubular members of which they are made, and to provide an effective gastight seal. Particularly advantageous is the fact that this method makes it possible to provide strong, sealed joints with tubular members, of comparatively weak or brittle, thin-walled construction.

Figure 7:
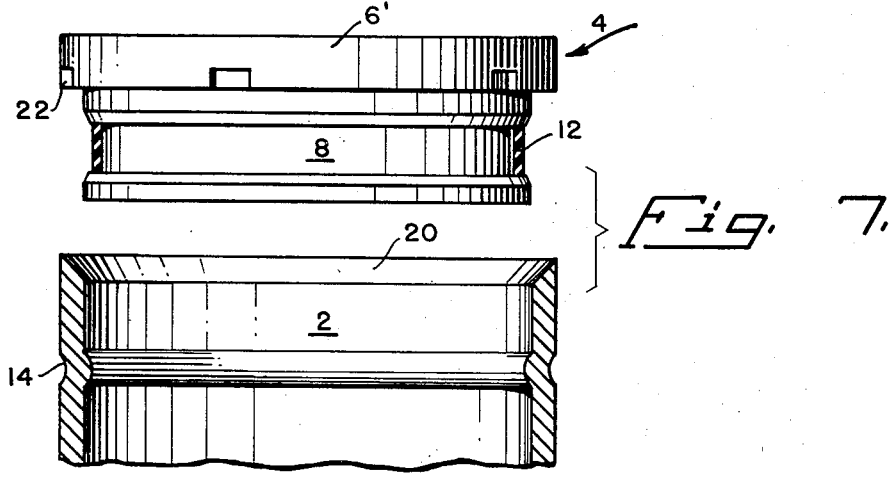
Fig. 7 is a showing of a cap and tubular member as prepared for joining by a modified method under this invention which is designed to give added restraint against relative rotation of the joined pieces.
Figure 8:
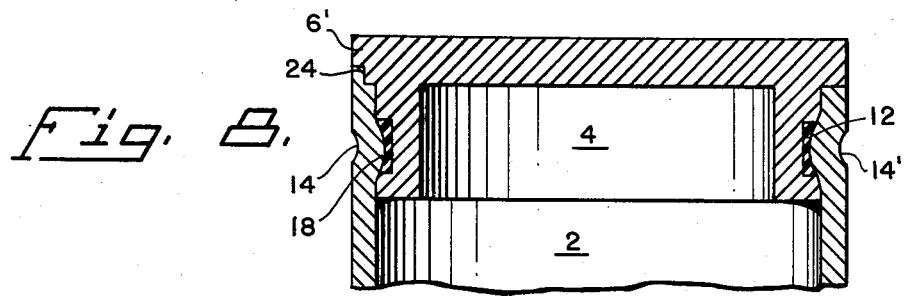
Fig. 8 is a vertical sectional view of the finished joint formed of the pieces illustrated in Fig. 7, when assembled according to this invention.

Figs. 7 and 8 illustrate a modified application of the invention wherein the "cold-flow" joint forming principle is further utilized to inhibit relative rotational movement of parts joined according to the method of this invention as previously described.

In the modification of Figs. 7 and 8 the cap element 4 and tubular member 2 are prepared, as described above, with certain additional preparatory steps. Thus, tubular member 2 is chamfered inwardly, as at 20, and the under side of flange 6 is provided with a series of circumferential notches 22, as shown in Fig. 7. The prepared pieces are then assembled and subjected to circumferential and axial pressures in the manner previously described in conjunction with the basic invention as described in connection with Figs. 1–6 to form the main joint between the pieces. As a result of the chamfering or beveled edge 20 of the tubular member, the thinned edge portion of tubular member 2 is caused to flow to form a generally rectangular shoulder to mate with the under side of the flange 6, with a portion of the material flowing into the notches 22 as at 24 (Fig. 8) to lock the pieces of the finished joint against relative rotational movement.

Figure 9:
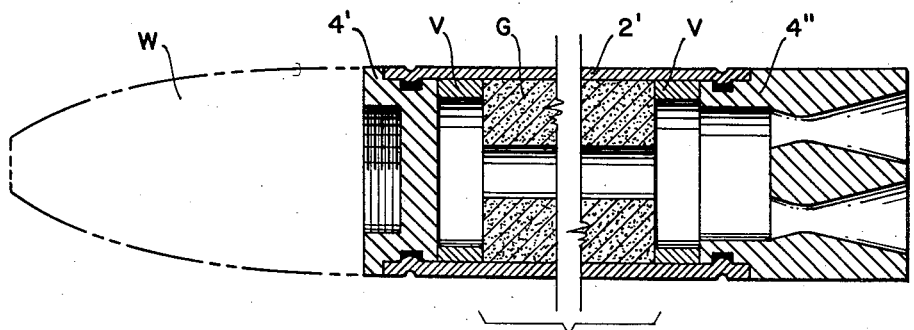
Fig. 9 is a vertical sectional view through a somewhat schematically shown rocket assembly, illustrating the application of the methods of this invention to the fabrication and assembly of rocket motors.

As mentioned in the introductory remarks, one of the particular adaptations of the instant invention is in the field of rocket motors. The strength and sealing qualities of joints formed by the instant method make possible the efficient, economical use of lighter, thinner tubing without the provision of sealing means additional to the sealing means incorporated in the joint, and without the necessity of maintaining expensive close tolerances on the tubing and on other parts utilized therewith to form the hitherto used prior art joints. The motor tube of a rocket motor is subject to extremes of heat and pressure, and any leak in a joint results in the flow of a stream of hot gases through the leak. Such a flow of hot gases burns the tube wall causing an ever enlarging opening, rupture of the tube wall, and explosion of the rocket motor. Fig. 9 shows the application of the instant invention to rocket motors, the thin-walled motor tube 2' containing a propellant grain G and suitable vibration damping and flame inhibiting means V and having a cap member 4' and a nozzle-plate 4" attached to opposite ends thereof by joints made according to this invention. The cap 4' is provided with threaded means for support of a warhead W shown in dotted lines.

From the above it should be evident that the present invention provides novel methods for forming joints in which at least one of the members is a thin-walled tubular member, said methods being adapted for use even with thin-walled tubular members made of comparatively weak and brittle materials and resulting in locked and sealed joints of greater strength than the tubular members themselves. It should also be evident that the present invention provides improved methods for making more efficient joints than hitherto possible with thin-walled tubing, such methods being more economical, easier to practice, and more reliable in result than known prior art methods.

The joint and joining method described above have been described in general terms both as to the nature of the material of which the members to be joined are constructed and as to the dimensions of the various parts, grooves, indentations, etc., described herein. As to the nature of the materials, obviously, a wide range of choice is permissible it being only necessary that the tubular member be relatively softer or more ductile than the cap member, one specific example previously mentioned being aluminum alloy, as used for the tubular member 2. Insofar as specific dimensions are concerned it should be obvious that these would vary for different joints according to the ultimate result desired, the nature of the materials used, and the wall thickness of the tubular member and that experiment and experience would determine the particular dimensions to be utilized in any particular joint.

Obviously, many modifications and variations of the present invention are possible in the light of the above teachings. It is therefore to be understood that the scope of the invention is to be considered as restricted only by the scope and limitations of the appended claims.

What is claimed is:

1. A method of forming a seal and joint between a first member which has an outwardly directed flange and a second tubular member, made of relatively softer material than said first member and of slightly greater internal size than the external size of said first member, said method comprising the steps of forming an annular groove of rectangular cross-section in the external surface of said first member at a given distance from said flange, inserting a sealing ring in said groove, forming a light annular indentation in the wall of the second member at a distance slightly greater than the said given distance from an end thereof, said indentation being from the outside in and formed by deforming the wall without removal of material therefrom, inwardly chamfering the open end of said second tubular member, and cutting small notches in the mating edge of the flange of said first member, assembling said two members by inserting said first member into the said end of said second member with the flange of the first member resting on the open end of the second member whereby the groove is slightly displaced from the indentation, placing the assembly in a die which is longer than the second member in such a position that the flange extends slightly outwardly of the die, applying inwardly directed circumferential pressure to the die to diminish the size of the second member slightly, and then applying longitudinal compressive force to the assembly to force the first member into the second member, while continuing application of said circumferential pressure, whereby upon the application of said circumferential and longitudinal pressures the material in said chamfered edge of said first member will be flowed into said notches to lock the two members against rotary movement relative to one another, and the material of the indentation is caused to flow into the groove to effect a fluid-proof joint of strength greater than the bursting strength of the walls of the second member.

2. A method of forming a locked joint between a first member which has an outwardly directed flange and a second tubular member, made of relatively softer material than said first member and of slightly greater internal size than the external size of said first member, said method comprising the steps of forming a groove in the external surface of said first member at a given distance from said flange, forming a light indentation in the outer surface of the wall of said second member at a distance slightly greater than the said given distance from an end thereof, inwardly chamfering the open end of said second tubular member, and cutting small notches in the mating edge of the flange of said first member, assembling said two members by inserting said first member into the said end of said second member with the flange of the first member resting on the open end of the second member whereby the groove is slightly displaced from the indentation, applying circumferential pressure radially inwardly of said second member to diminish its size, and then applying longitudinal compressive force to the assembly while continuing the application of said circumferential pressure, whereby upon the application of said circumferential and longitudinal pressures the material in said chamfered edge of said first member will be flowed into said notches to lock the two members against rotary movement relative to one another, and the material in the area of said indentation is caused to flow into said groove to effect a tight connection between the members.

3. In the method of claim 2, the further step of inserting a sealing ring in said groove in said first member, prior to said step of assembling the members.

References Cited in the file of this patent
UNITED STATES PATENTS

| | | |
|---|---|---|
| 1,911,775 | Smith et al. | May 30, 1933 |
| 2,198,643 | Wendel et al. | Apr. 30, 1940 |
| 2,272,244 | Klein | Feb. 10, 1942 |
| 2,327,650 | Klein | Aug. 24, 1943 |
| 2,426,526 | Rutishauser et al. | Aug. 26, 1947 |
| 2,477,676 | Woodling | Aug. 2, 1949 |
| 2,485,699 | Christie | Oct. 25, 1949 |
| 2,741,498 | Elliott | Apr. 10, 1956 |